Jan. 5, 1932.   C. J. LEHN   1,839,234
HUMIDIFIER
Filed Feb. 25, 1929
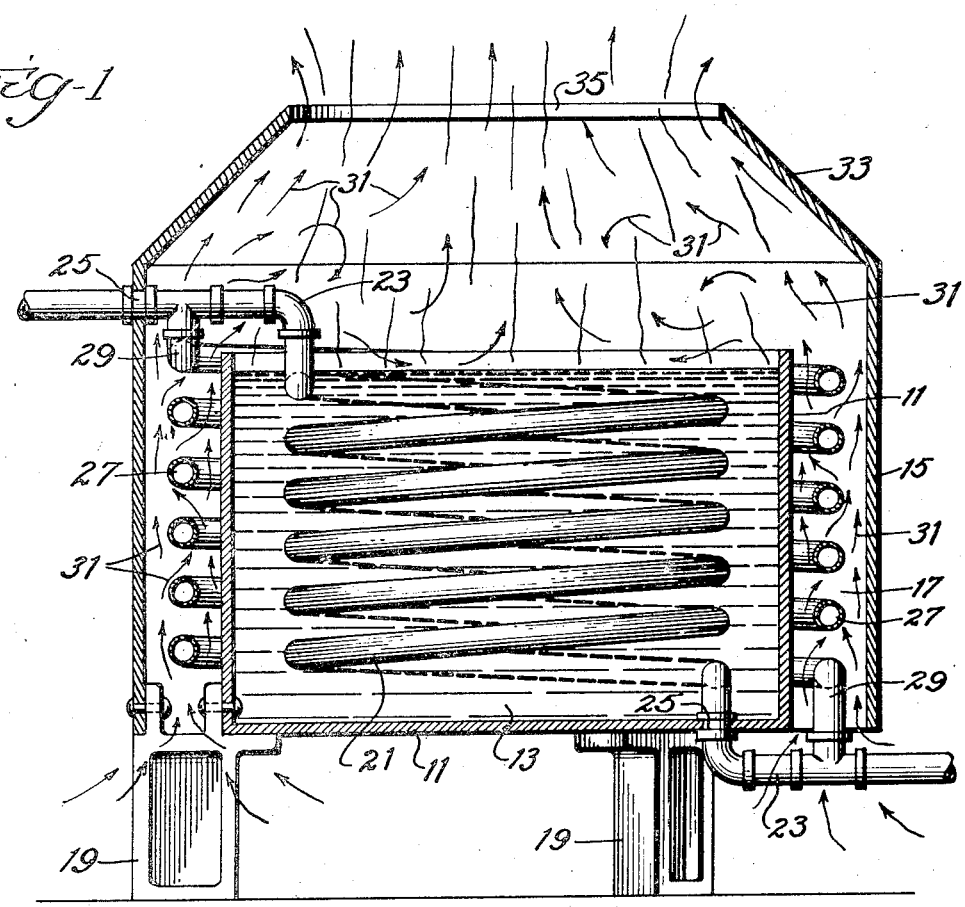
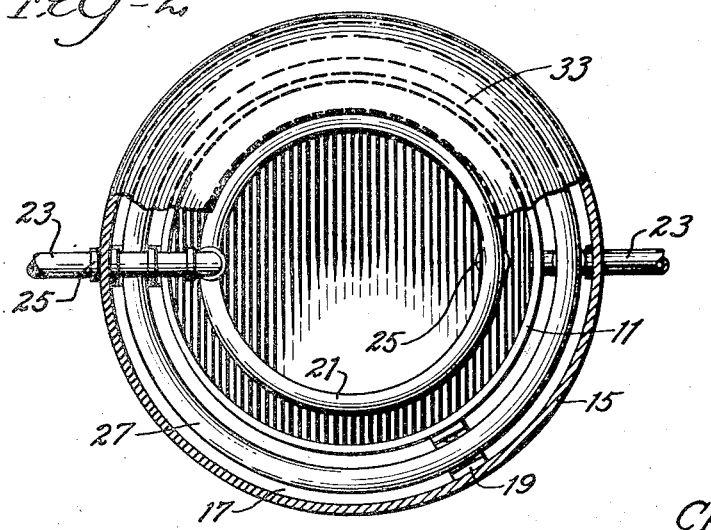
Inventor:—
CHARLES J. LEHN
By:— Cheever, Cox & Moore
Atty's.

Patented Jan. 5, 1932

1,839,234

UNITED STATES PATENT OFFICE

CHARLES J. LEHN, OF OAK PARK, ILLINOIS

HUMIDIFIER

Application filed February 25, 1929. Serial No. 342,418.

My present invention relates to humidifiers and has more particular reference to an improved humidifier of my invention for use in connection with heating systems whereby moisture may be created and dispersed into the atmosphere most efficiently and with a minimum expenditure of effort.

It has been found that the expense of heating dwellings and other places of human habitation may be decreased by providing a suitable amount of moisture in the heated atmosphere because substantially higher temperatures must be maintained where there is a deficiency of moisture in the atmosphere in order to furnish a suitable living temperature. This is because a certain amount of humidity is necessary to make heat effective on the human system and it is a well known fact that a room having a high actual temperature may appear to be colder, if there is a deficiency of moisture, than a properly humidified room having a lower actual temperature. On the other hand the presence of more than a certain definite amount of humidity in the atmosphere will not improve its apparent warmth so that if the degree of humidity maintained is too high, the cost of maintaining the humidity offsets the saving in heating expense. For maximum efficiency it is desirable to maintain the humidity as an approximately constant function of normal room temperature.

Heretofore it has been the custom to create moisture in the atmosphere of a heated room by providing pans or other suitable containers of water in close proximity to the heating unit, either by standing or suspending the pans on the heaters so that the water might be heated and the evaporation increased. At best this method is approximate and has numerous disadvantages. The pans must be frequently filled with water. The amount of moisture produced varies in accordance with the area of the fluid exposed and this may be large or small depending upon the size and shape of the vessel. The moisture produced also varies as the distance from the pan to the heater and is further reduced by the necessity of transferring the heat from the heater by air connection and conduction through the pan, that is to say, by the necessity of heating the water indirectly. Further disadvantages arise because the pans are unsightly and cannot be replenished with water due to their peculiar shape which in turn is determined by the necessity of hanging them on the heater in a confined space, usually the narrow space between the radiator and an adjacent wall, and are generally cumbersome and unsightly and hard to handle. Another disadvantage is that no provision is made for leading off the moisture created so that in the vicinity of the pan the humidity is high while elsewhere it is low.

It should be clearly understood that the normal humidity of a room is reduced by the operation of a heater in the room and it has been found that the effective humidity decreases as a function of the amount of heat introduced into the atmosphere so that means should be provided for increasing the humidity of the atmosphere in proportion to the amount of heat provided for heating. The ratio of the amount of heat added to the moisture which should be added to an atmosphere in order to maintain the same comfortable for human habitation is practically constant for all classes of rooms and atmospheres and it is an important object of my present invention to provide a neat compact and sightly device for positively maintaining the humidity of the atmosphere in a heated room as a function of the temperature within narrow limits.

Another important object of my present invention is to provide a humidifier in which the temperature of the heating medium operates directly to produce a suitable corresponding evaporation of moisture.

Another important object of my present invention is to provide a humidifier of improved efficiency.

Another important object of my invention is to provide a humidifier for use in connection with a heating system wherein a heating element is immersed directly in the humidifying medium to thus ensure a positive generation of humidity without any loss of humidity producing heat.

Another important object of my invention is to provide a humidifier for use in connection with a heating system wherein a heating element is immersed directly in the humidifying medium to promote its evaporation and consequently induce a more efficient production of humidity as a direct and controllable function of the heat supplied by the system.

Another important object of my invention is to provide a humidifier having improved means for ejecting the humidity produced in the humidifier into the atmosphere.

Still another important object of my invention is to provide a humidifier having means for positively causing evaporation of a humidifying medium as a function of the heat being supplied to a heated atmosphere and associated means for positively and effectively ejecting the evaporated medium from the humidifier into the atmosphere.

Numerous other objects and advantages will be apparent as the invention is more fully understood from the following description which, taken in connection with the accompanying drawings, discloses a preferred embodiment of my invention.

Referring to the drawings:

Figure 1 is a longitudinal section taken through a combination heater and humidifier embodying my invention; and Figure 2 is a top plan view of the device illustrated in Figure 1, parts of which are shown in broken section to illustrate details of construction.

To illustrate my invention I have shown on the drawings a humidifier of improved operating efficiency comprising a cistern or vessel 11 adapted to contain a humidifying medium 13 such as water, and an enclosing shell or housing 15 encircling the side walls of the cistern, but open at the top and bottom so as to provide an annular channel 17 between the walls of the cistern and the housing. The cistern 11 and surrounding shell or housing 15 may be supported on suitable legs 19 which are spaced at intervals around the humidifier and which also act as spacing means for maintaining the cistern and housing in spaced relationship.

A suitable heater 21, which in the illustrated embodiment comprises a coil of pipe through which a heating medium, such as steam, may be passed, but which equally well may be an electric or any other suitable heater, is arranged in the cistern in position such that it will be immersed in the humidifying medium when the cistern is full. The heater 21 is provided with end connections 23 extending outwardly through the walls of the cistern 11 and housing 15 whereby the heater may be connected, through suitable check valves (not shown) if desired, to a suitable source of heating medium, the connections 23 being provided with suitable gaskets or bushings 25 at the points in the walls of the cistern and housing through which they penetrate.

The heater 21 is adapted to receive heat in proportion as it is desired to create humidity and being immersed directly in the humidifying medium is well adapted to create a maximum evaporation in the heating medium with a minimum of heat supplied to the heater 21.

In order to create a positive ejection of the moisture generated by the evaporation of the heating medium in the cistern, I provide a second heater 27 which in the present instance comprises a coil of pipe, similar to the heater 21, arrange same in the annular channel 17 surrounding the cistern and provide end connections 29 whereby the second heater may also be connected to a suitable source of heating medium supply. The heaters 21 and 27 may be conveniently and are preferably connected in parallel across the same source of heat supply, as illustrated in the drawings, although if desired either heater or both heaters may be provided with control or check valves (not shown) for regulating the amount of heat generated in each heater.

It will be apparent that when the heater 27 is operated, convection air currents, as indicated by the arrows 31 in Figure 1 of the drawings, will be set up so that a stream of air will pass up through the annular channel 17 around the sides of the cistern 11. The upper edges of the housing 15 are offset inwardly to form a cowl shaped baffle 33 in the path of the air currents 31 to deflect same inwardly and over the top of the cistern, to entrain and carry off the moisture evaporated from the cistern. The top of the baffle provides air opening 35 through which the air currents and moisture carried thereby may finally escape from the humidifier into the surrounding atmosphere.

Care should be exercised in forming the housing 15 and baffle 33 in order that at no time shall the cross sectional area of the path of the air currents 31 be constricted or the device will choke up and operate inefficiently. Cool air entering the bottom of the channel 17 is relatively dense and upon being heated will expand and occupy more space. In addition to this the air picks up moisture from the cistern and increases its bulk still further, for this reason it is desirable to increase the area of the air passage and to form the opening 35 sufficiently large to permit of the free passage of the increased volume of the moisture laden heated air.

I contemplate the provision of means for maintaining the humidifying medium at a constant level in the cistern, this means may be of any suitable form or construction such for instance as a pipe or conduit connecting with a remote source of humidifying medium and a valve controlled by the level of the humidifying medium in the cistern and so calibrated to permit humidifying medium to enter the cistern only when the level falls below a predetermined mark.

I desire to call attention to the fact that a humidifier of the type described may be substituted for the ordinary house heating radiator, provided the heater 27 is made sufficiently large, and that the device of my invention has an enlarged scope although it may also be conveniently arranged to form merely an improved humidifier.

It is thought that the invention and numerous of its attendant advantages will be apparent from the foregoing description, and it is obvious that numerous changes may be made in the form construction and arrangement of the various parts without departing from the spirit and scope of the invention or sacrificing any of its material advantages, the form which I have hereinbefore described being of a preferred embodiment for the purpose of demonstrating my invention.

Having thus described my invention, what I claim as new and desire to secure by Letters Patent is:

1. A humidifier comprising a water cistern having an upwardly extending opening, a heater mounted in said cistern in position to be immersed in the water therein and a casing encircling said cistern and spaced from the walls thereof to provide a peripheral air channel, spacing means to secure the casing in spaced relationship with respect to the walls of the cistern, said casing being opened at its lower end and extending upwardly of the upper end of the cistern, the upper portions of the casing being formed to provide a restricted opening above the cistern, the area of said restricted opening being not less than the area of said air channel and a heater arranged in said air channel whereby to cause ascending air currents in said channel.

2. A humidifier comprising a centrally arranged water container having an opening in its upper end, a heater arranged in said container in position to be immersed in the water therein, a shell encircling the container and spaced from the walls thereof to provide there between an air channel extending upwardly along the sides of the container, said casing having an opening at its lower end to permit air to enter the air channel, the upper end of the casing being formed to extend across the top of the water container and being provided with a restricted opening substantially above the opening of the container, support means for said container and said shell, means to maintain the shell in spaced relationship with respect to the container and a heater disposed in said air channel adjacent the side walls of the water container whereby to heat the air in the channel and cause same to move upwardly of the side walls of the container and across the upper opened end of the container and thence out through the restricted opening of the casing.

3. A heater for a humidifier device comprising an open top tank, containing a humidifying medium, a heater arranged in the tank in position to be immersed in the medium, a main heater embracing the walls of the tank and an enclosing shell encircling the tank and the main heater and comprising a wall spaced from the tank to create an air channel between the shell and the tank in which the main heater is located, said shell having an opening in its lower end and having its upper end formed to provide a baffle and a restricted opening above the opened top of the tank and means connecting said heater to a source of heat whereby the smaller heater will cause evaporation of the humidifying medium and the main heater will heat the air in the air channel and create ascending air currents in the air channel and along the sides of the tank which currents will be deflected by the baffle across the upper opened end of the tank whereby to entrain the evaporating medium and carry same outwardly through the restricted opening of the shell into the surrounding atmosphere, to thereby condition said atmosphere with respect to temperature and humidity.

4. A humidifier comprising an open top cistern adapted to contain a humidifying medium, a heater arranged in the cistern in position to evaporate the humidifying medium, an external heater hugging the side of the cistern and a tubular shell encircling the cistern and the external heater, said shell being spaced from the walls of the cistern to provide in conjunction therewith, an air channel extending upwardly along the sides of the cistern, said shell extending upwardly of the opened top of the cistern and having an inwardly extending portion overhanging the upper end of the cistern and defining a restricted outlet opening disposed substantially above the cistern opening and means to connect the heater to a heat producing source.

5. A humidifier comprising a water cistern having an upwardly extending opening, a heater mounted in said cistern in position to be immersed in the water therein and a casing enclosing said cistern and spaced from the walls thereof to provide an air channel around the cistern, means to support the casing in spaced relationship with respect to the walls of the cistern, said casing having an opening at its lower end and extending upwardly of the upper end of the cistern, the upper portions of the casing being formed to provide a restricted opening above the cistern, and a heater arranged in said air channel whereby to cause ascending air currents in said channel.

6. A heating and humidifying system comprising means forming a vertically extending channel having an air intake opening at its lower end and a discharge opening at its upper end, means to restrict the discharge opening, a water cistern having walls defining an upward opening in said channel, said cistern opening being located in said channel substantially below the discharge opening thereof, a heater in said cistern in position to immerse in the water therein and aid in the evaporation thereof and a heater mounted in the channel substantially below the cistern opening to create upwardly moving warm air currents along the walls of the cistern and past the upward opening thereof whereby to entrain the evaporated moisture at the cistern opening and carry it with the heated air currents out through the upper channel opening.

7. A heating and humidifying system comprising means forming a vertically extending channel having an air intake opening at its lower end and a discharging opening at its upper end, means to restrict the discharge opening, a water cistern having walls defining an upward opening in said channel, said cistern opening being located in said channel substantially below the discharge opening thereof, a heater in said cistern in position to immerse in the water therein and aid in the evaporation thereof and a heater mounted in the channel substantially below the cistern opening to create upwardly moving warm air currents along the walls of the cistern and past the upward opening thereof whereby to entrain the evaporated moisture at the cistern opening and carry it with the heated air currents out through the upper channel opening, said heaters comprising means forming conductor channels for a heating medium, connector means in said air channel for connecting an end of both conductor channels to a common source of heating medium supply and additional means in said air channel for connecting the other ends of said conductor channels to a common return main in order to render the unit substantially self contained and to minimize plumbing operations during installation.

8. A humidifier comprising a water cistern having an upwardly extending opening, a heater mounted in said cistern in position to be immersed in the water therein and a casing enclosing said cistern and spaced from the walls thereof to provide an air channel around the cistern, means to support the casing in spaced relationship with respect to the walls of the cistern, said casing having an opening at its lower end and extending upwardly of the upper end of the cistern, the upper portions of the casing being formed to provide a restricted opening above the cistern, and a heater arranged in said air channel whereby to cause ascending air currents in said channel and a fitting within the zone of the casing, connections from said fitting to an external source of a suitable heating medium, and means connecting both heaters to said fitting.

9. A humidifier comprising a water cistern having an upwardly extending opening, a heater mounted in said cistern in position to be immersed in the water therein and a casing enclosing said cistern and spaced from the walls thereof to provide an air channel around the cistern, means to support the casing in spaced relationship with respect to the walls of the cistern, said casing having an opening at its lower end and extending upwardly of the upper end of the cistern, the upper portions of the casing being formed to provide a restricted opening above the cistern, and a heater aranged in said air channel substantially below the upwardly extending opening of the cistern to create air currents to ascend in the channel past said opening to entrain evaporated moisture escaping through the cistern opening, and a fitting within the zone of the casing, connections from said fitting to an external source of a suitable heating medium, and means connecting both heaters to said fitting.

In witness whereof, I have hereunto subscribed my name.

CHARLES J. LEHN.